United States Patent
Coupechoux et al.

(10) Patent No.: US 7,545,776 B2
(45) Date of Patent: Jun. 9, 2009

(54) METHOD FOR IMPROVING HANDOVERS IN A WLAN

(75) Inventors: Marceau Coupechoux, Paris (FR); Lionel Fiat, Garches (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/244,068

(22) Filed: Oct. 6, 2005

(65) Prior Publication Data
US 2006/0077933 A1   Apr. 13, 2006

(30) Foreign Application Priority Data
Oct. 13, 2004   (EP)   .................................. 04292437

(51) Int. Cl.
*H04Q 7/32*   (2006.01)
(52) U.S. Cl. ........................ 370/331; 370/329; 370/328; 370/332; 370/336; 455/426.1; 455/426.2; 455/422.1; 455/436; 455/437
(58) Field of Classification Search ................. 370/329, 370/328, 332, 336, 331, 310, 345, 343; 455/436–441, 455/442, 443, 444, 445, 422.1, 426.1, 426.2, 455/403, 67.11, 423–425, 500, 517, 550.1, 455/414.1–414.4, 432.1, 434
See application file for complete search history.

(56) References Cited

U.S. PATENT DOCUMENTS

| 2003/0174690 A1 | 9/2003 | Benveniste |
| 2004/0092232 A1* | 5/2004 | Zeira et al. ................ 455/67.11 |
| 2004/0185853 A1* | 9/2004 | Kim et al. ................... 455/438 |

FOREIGN PATENT DOCUMENTS

| EP | 1 398 912 A | 3/2004 |
| WO | WO 2004/054283 A | 6/2004 |

* cited by examiner

*Primary Examiner*—Keith T Ferguson
(74) *Attorney, Agent, or Firm*—Sughrue Mion, PLLC

(57) ABSTRACT

A method of handover between two WLAN cells based on the IEEE 802.11 standard and working at two different frequencies, the method including the step of performing measurement(s) on the second frequency in order to verify the necessity or the opportunity to realise a handover, the first frequency being currently used to transmit data, the method characterised in that it involves: first sending at least one dummy data or control frame on the first frequency which is currently used for transmitting data, the data or control frame including a duration data with a value at least equal to the time needed to perform the measurement(s) at the second frequency, and, then performing the measurement(s) on the second frequency.

11 Claims, 1 Drawing Sheet

METHOD FOR IMPROVING HANDOVERS IN A WLAN

BACKGROUND OF THE INVENTION

The invention is based on a priority application EP04292437.3 which is hereby incorporated by reference.

The present invention is related to the field of wireless communication networks, more particularly the handover procedures in WLANs, and concerns a method for improving such procedures, in particular terms of data losses and handover optimisation, as well as an access point and a terminal able to perform this method.

Wireless networks have generally a cellular structure and are therefore subjected to handover procedures, and thus necessarily encounter the problem of continuity of communication, especially in case of voice data. The critical phase of that aspect of the handover procedure is the determining of the right moment at which to execute the handover, especially as the used radio devices are single-frequency.

Presently, the wireless local area network (WLAN) standards IEEE 802.11a/b/g are experiencing a successful development. This success is drawn by two main types of networks: enterprise networks and hot spots, i.e., conference centres, railway stations, airports, hotels . . . .

In both environments, VoIP (Voice over Internet Protocol) and VoWLAN are becoming attractive technologies with the main goal to reduce the communication costs by merging data and voice networks. Offering session continuity between hot spots and cellular networks could make VoWLAN technology very interesting, for all voice applications and for telecommunication operators.

In this context, the handover between two WLAN cells at different frequencies is a critical subject because the handover time has to be drastically reduced in order to allow VoWLAN seamless mobility between two IEEE 802.11 cells.

Several proposed schemes to solve this problem are based on channel measurements on a different frequency by the access point (AP) or by the mobile terminal (STA).

Such measurements can, for example, concern the signal power or the signal to noise ratio. The results of such possible repetitive measurements are compared to the values of the equivalent parameter(s) of the presently used channel f1 in order to determine if the conditions for a handover are fulfilled.

Possible measurement mechanisms are for example described in IEEE 802.11 k (standard draft).

Nevertheless, making measurements on a different frequency may imply packet or frame losses on the original frequency when the measuring occurs on the other frequency, since radio devices are single-frequency.

SUMMARY OF THE INVENTION

The main problem to be solved by the present invention is to overcome this drawback, by proposing a solution which is simple and fully compatible with the above-mentioned IEEE standard in its present version.

Therefore, the present invention proposes a method for improving the handover procedure between two WLAN cells C1 and C2 based on IEEE 802.11 standard and working at two different frequencies f1 and f2, said method comprising the step of performing measurement(s) on the second frequency f2 in order to verify the necessity or the opportunity to realise a handover, the first frequency f1 being currently used to transmit data.

The inventive method is characterised in that it consists more precisely in:
first sending at least one dummy or fake data or control frame (Frame 1 in the FIGURE) on said first frequency f1 which is currently used for transmitting data, said data or control frame comprising a duration data with a value at least equal to the time needed for the entity 10 to perform said measurement(s) at said second frequency f2, and,
then performing said measurement(s) on said second frequency f2 for a time period corresponding at the most to the value of the duration data set in the sent dummy or fake data or control frame, while any terminal, station, access point or similar entity 20 of the concerned WLAN is forbidden or disabled to send or transmit any data on said first frequency f1 during a time period corresponding to said duration data value.

Preferably, during a time period corresponding to the value of the duration data present in the dummy or fake data or control frame and starting from the moment of reception of said frame, any terminal, station, access point or similar entity 20 belonging to the concerned WLAN retains itself from accessing the radio channel corresponding to the first frequency f1.

These frames may for example be managed in a IEEE 802.11e standard way.

Advantageously, the duration data is contained within a specific duration field of a dummy or fake data or control frame sent by the terminal, station or access point intending to perform the measurement(s) or sent back by a station or access point of the WLAN having received a first dummy or fake data or control frame.

Thanks to the inventive features described before, the measurement phases are equivalent to the transmission, in the concerned WLAN cells C1 and C2 working according to IEEE 802.11 standard, of virtual and non viewable MAC frames transmitted on f1 frequency channel (from the standpoint of the other entities of the WLAN).

Thus, no significant and substantive data or control frame will be lost.

According to a first embodiment of the invention, when said measurement(s) on the second frequency f2 is (are) to be performed by an access point (AP) of the concerned WLAN, said access point (e.g., entity 10 in the FIGURE) first sends a fake request-to-send (RTS) frame (e.g., Frame 1) with the duration data on the first frequency f1 channel and then switches to the second frequency f2 to perform said measurement(s) possibly after having received in return corresponding CTS frames, followed by acknowledgement messages.

Preferably, said dummy RTS frame is sent to a fake destination medium access control (MAC) address.

During the time period of transmission inhibition, the concerned access point AP can, for example, perform a measurement of the traffic associated to an other access point using the second frequency f2 for transmission.

The results of said measurement(s) can be used to manage the terminal mobility between the two afore-mentioned access points.

According to a second embodiment of the invention, the entity 10 in the FIGURE may be a mobile terminal, and when said measurement(s) on the second frequency f2 is (are) to be performed by the mobile terminal (STA), the mobile terminal (entity 10 in the FIGURE) first sends a fake request-to-send RTS frame, with the duration data, on the first frequency f1 to the access point AP (e.g., entity 20 in the FIGURE) to which it is linked to in the current cell C1. Then said mobile terminal switches to the second frequency f2 to perform said measurement(s), while the concerned access point AP sends out a clear-to-send (CTS) frame which also includes the aforesaid duration data.

Alternatively, the method according to the invention can provide that, after reception of the fake RTS frame from the mobile terminal, the concerned access point AP sends out a clear-to-send CTS frame on f1 which also includes the aforesaid duration data, and that then said mobile terminal switches to the second frequency f2 to perform said measurement(s), possibly after having sent back an acknowledgement frame to the access point AP.

In case of medium access based on carrier sense multiple access with collision avoidance (CSMA/CA) protocol, each terminal, station, access point or similar entity of the concerned WLAN belonging to the cell C1 working at the first frequency f1 and receiving a dummy or fake RTS or CTS type frame, sets its network allocation vector (NAV) according to the value of the duration data included in said received frame.

DETAILED DESCRIPTION OF THE INVENTION

Figure 1:
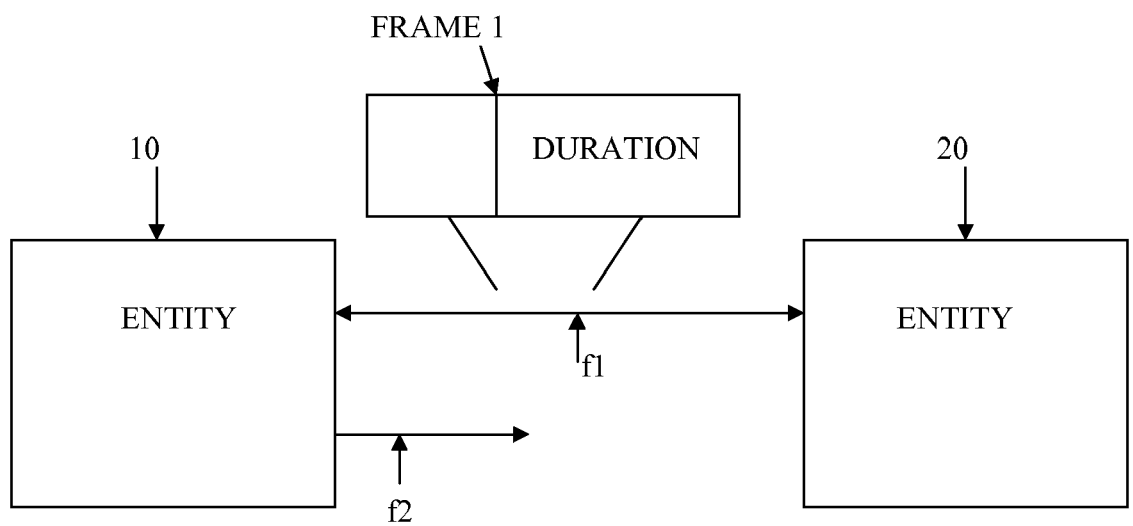
FIG. 1 illustrates a flow chart of the improved handover technique according to the present invention.

The invention will now be described in a more detailed way based on specific examples.

The MAC (media access control) layer of IEEE 802.11 is based on CSMA/CA, i.e., carrier sensing is used in order to avoid collisions.

There are two mechanisms of carrier sensing: the first one is centralised (point coordination function/PCF), the second one is said to be distributed (DCF/Distributed Coordination Function).

The latter mechanism works as follows: each frame RTS/CTS/DATA includes a duration field that provides the duration of the current frame exchange. Nodes (STA or AP) that hear this field retain themselves from accessing the channel during this frame exchange in order to avoid collisions.

In case an AP (current working frequency: f1) wants to do a measurement on frequency f2, it sends an RTS with preferably a fake destination MAC address (an AP known MAC address may be used but it may imply unsatisfying behaviour of STA). The duration field is however set to the value needed to do the measurements on f2. All STA can hear and decode this RTS and do not transmit during the indicated duration. So the concerned AP can switch to f2 without loosing any data.

In case a STA (currently switched on f1) wants to do a measurement on f2, said STA sends an RTS to the AP with the desired duration and can then switch to f2. It is necessary in this case to send the RTS to the related AP and said AP replies with the CTS, that also includes the duration field, all STA in the f1 cell C1 are now aware of the measurement duration.

The present invention also concerns an access point of a wireless local area network WLAN based on IEEE 802.11 standard, with a first frequency f1 channel for transmitting data or control frames and able to switch to at least a second frequency f2 channel for performing measurement(s), said access point currently using said first frequency f1 to transmit data or control frames and comprising means for performing measurement(s) on the second frequency f2.

Said access point (e.g., entity 10 in the FIGURE) is characterised in that it comprises more precisely:

means for sending at least one dummy or fake data or control frame (Frame 1) on said first frequency f1 currently used for transmitting data, said data or control frame comprising a duration data with a value at least equal to the time needed to perform said measurement(s) at said second frequency f2, and, means for actually performing said measurement(s) on said second frequency f2 for a time period corresponding at the most to the value of the duration data set in the sent dummy or fake data or control frame, while any terminal, station, access point or similar entity (20) of the concerned WLAN is forbidden or disabled to send or transmit any data on said first frequency f1 during a time period corresponding to said duration data.

Finally, the invention also encompasses a terminal in particular mobile terminal, adapted for use in a wireless local area network WLAN based on IEEE 802.11 standard, with a first frequency f1 channel and at least a second frequency f2 channel for transmitting data or control frames, said terminal currently using said first frequency f1 to transmit data or control frames and comprising means for performing measurement(s) on the second frequency f2.

Said terminal (e.g., entity 10 in the FIGURE according to this embodiment) is characterised in that it comprises more precisely:

means for sending at least one dummy or fake data or control frame (Frame 1) on said first frequency f1 currently used for transmitting data, said data or control frame comprising a duration data with a value at least equal to the time needed to perform said measurement(s) at said second frequency f2, and, means for actually performing said measurement(s) on said second frequency f2 for a time period corresponding at the most to the value of the duration data set in the sent dummy or fake data or control frame, while any terminal, station, access point or similar entity (e.g., 20) of the concerned WLAN is forbidden or disabled to send or transmit any data on said first frequency f1 during a time period corresponding to said duration data.

Both afore-mentioned devices are advantageously able to perform the method described herein before.

The present invention is, of course, not limited to the preferred embodiment described herein, changes can be made or equivalents used without departing from the scope of the invention.

The invention claimed is:

1. Method for improving the handover procedure between two WLAN cells based on IEEE 802.11 standard and working at two different frequencies, said method comprising the step of performing measurement(s) on the second frequency in order to verify the necessity or the opportunity to realise a handover, the first frequency being currently used to transmit data, method wherein it comprises more precisely:

first sending at least one dummy or fake data or control frame or management on said first frequency which is currently used for transmitting data, said data or control frame comprising a duration data with a value at least equal to the time needed to perform said measurement(s) at said second frequency, and, then performing said measurement(s) on said second frequency for a time period corresponding at the most to the value of the duration data set in the sent dummy or fake data or control frame, while any terminal, station, access point or similar entity of the concerned WLAN is forbidden or disabled to send or transmit any data on said first frequency during a time period corresponding to said duration data value.

2. Method according to claim 1, wherein during a time period corresponding to the value of the duration data present in the dummy or fake data or control frame and starting from the moment of reception of said frame, any terminal, station, access point or similar entity belonging to the concerned WLAN retains itself from accessing the radio channel corresponding to the first frequency.

3. Method according to claim 1, wherein the duration data is contained within a specific duration field of a dummy or fake data or control frame sent by the terminal, station or access point intending to perform the measurement(s) or sent back by a station or access point of the WLAN having received a first dummy or fake data or control frame.

4. Method according to claim 1, when said measurement(s) on the second frequency is (are) to be performed by an access point (AP) of the concerned WLAN, said access point first sends a fake request-to-send (RTS) frame with the duration data on the first frequency channel and then switches to the second frequency to perform said measurement(s), possibly after having received in return corresponding CTS frames, followed by acknowledgement messages.

5. Method according to claim 4, wherein said dummy RTS frame is sent to a fake destination medium access control (MAC) address.

6. Method according to claim 4, wherein the concerned access point (AP) performs a measurement of the traffic associated to an other access point using the second frequency for transmission.

7. Method according to claim 1, comprising when said measurement(s) on the second frequency is (are) to be performed by a mobile terminal (STA), this latter first sends a request-to-send (RTS) frame, with the duration data, on the first frequency to the access point (AP) to which it is linked to in the current cell and then switches to the second frequency to perform said measurement(s), while the concerned access point (AP) sends out a clear-to-send (CTS) frame which also includes the aforesaid duration data.

8. Method according to claim 1, comprising when said measurement(s) on the second frequency is (are) to be performed by a mobile terminal (STA), this latter first sends a request-to-send (RTS) frame, with the duration data, on the first frequency to the access point (AP) to which it is linked to in the current cell, that then the concerned access point (AP), after reception of the fake RTS frame, sends out a clear-to-send (CTS) frame on the first frequency which also includes the aforesaid duration data and that, finally, said mobile terminal (STA) switches to the second frequency to perform said measurement(s), possibly after having sent back an acknowledgement frame to the access point (AP).

9. Method according to claim 1, wherein in case of medium access based on carrier sense multiple access with collision avoidance (CSMA/CA) protocol, each terminal, station, access point or similar entity of the concerned WLAN belonging to the cell working at the first frequency and receiving a dummy or fake RTS or CTS type frame, sets its network allocation vector (NAV) according to the value of the duration data included in said received frame.

10. Access point of a wireless local area network (WLAN) based on IEEE 802.11 standard, with a first frequency channel for transmitting data or control frames and able to switch to at least a second frequency channel for performing measurement(s), said access point currently using said first frequency to transmit data or control frames and comprising means for performing measurement(s) on the second frequency, wherein it comprises more precisely:

means for sending at least one dummy or fake data or control frame on said first frequency currently used for transmitting data, said data or control frame comprising a duration data with a value at least equal to the time needed to perform said measurement(s) at said second frequency, and, means for actually performing said measurement(s) on said second frequency for a time period corresponding at the most to the value of the duration data set in the sent dummy or fake data or control frame, while any terminal, station, access point or similar entity of the concerned WLAN is forbidden or disabled to send or transmit any data on said first frequency during a time period corresponding to said duration data.

11. Terminal, in particular mobile terminal, adapted for use in a wireless local area network (WLAN) based on IEEE 802.11 standard, with a first frequency channel and at least a second frequency channel for transmitting data or control frames, said terminal currently using said first frequency to transmit data or control frames and comprising means for performing measurement(s) on the second frequency, wherein it comprises more precisely:

means for sending at least one dummy or fake data or control frame on said first frequency currently used for transmitting data, said data or control frame comprising a duration data with a value at least equal to the time needed to perform said measurement(s) at said second frequency, and, means for actually performing said measurement(s) on said second frequency for a time period corresponding at the most to the value of the duration data set in the sent dummy or fake data or control frame, while any terminal, station, access point or similar entity of the concerned WLAN is forbidden or disabled to send or transmit any data on said first frequency during a time period corresponding to said duration data.

* * * * *